April 14, 1936.  M. R. FENSKE ET AL  2,037,319
PROCESS FOR TREATING MINERAL OILS
Filed Nov. 21, 1933  5 Sheets-Sheet 1
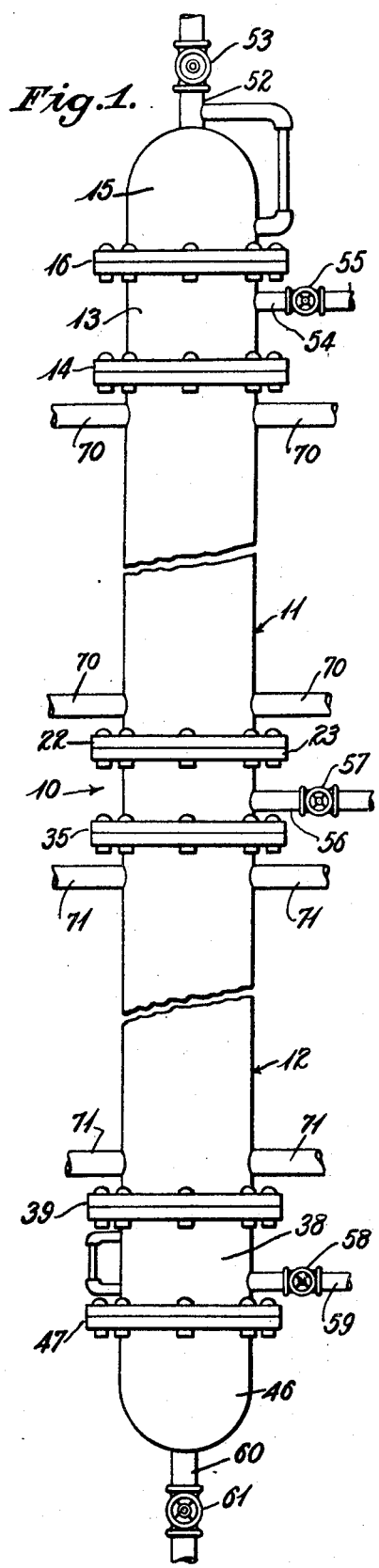
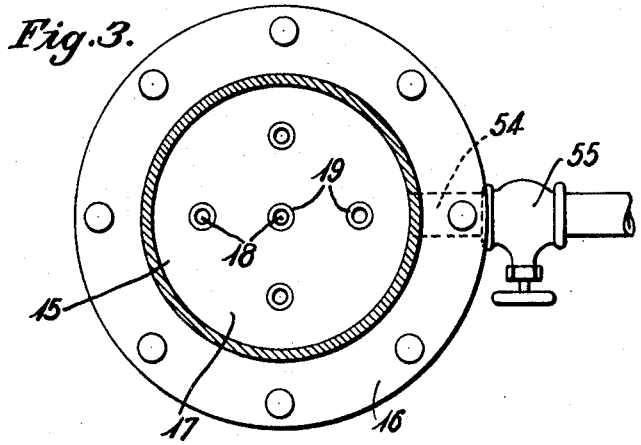
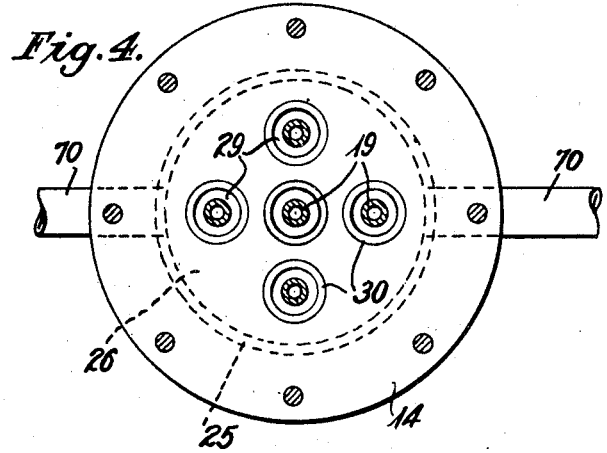
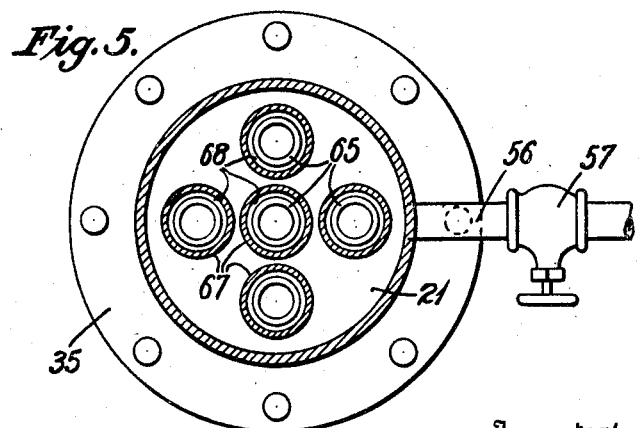
Inventors
Merrell R. Fenske
and Wilbert B. McCluer
By Hugo A. Kennan Attorney April 14, 1936.   M. R. FENSKE ET AL   2,037,319
PROCESS FOR TREATING MINERAL OILS
Filed Nov. 21, 1933   5 Sheets-Sheet 2
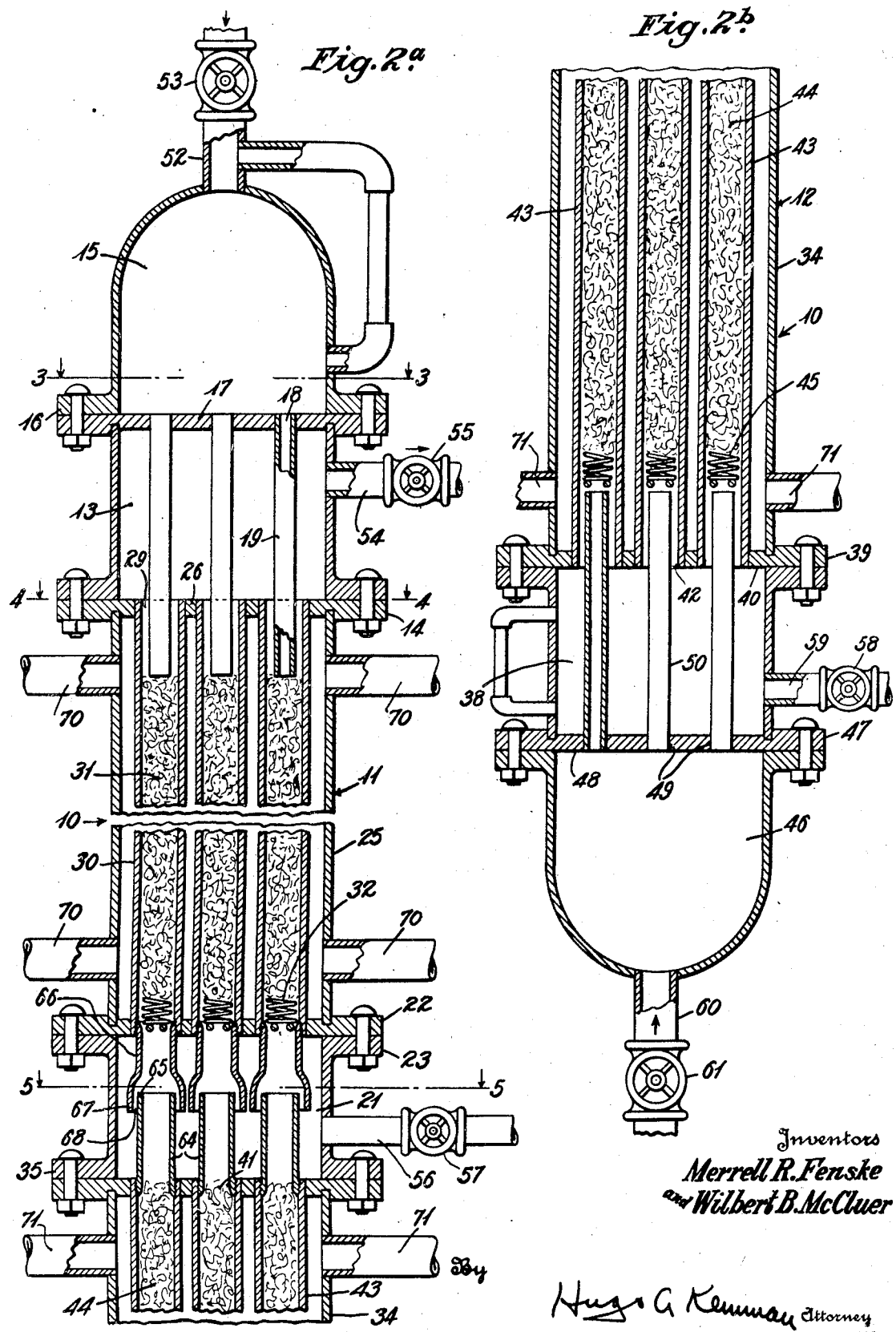
Inventors
Merrell R. Fenske
and Wilbert B. McCluer
By Hugo G. Kennan Attorney

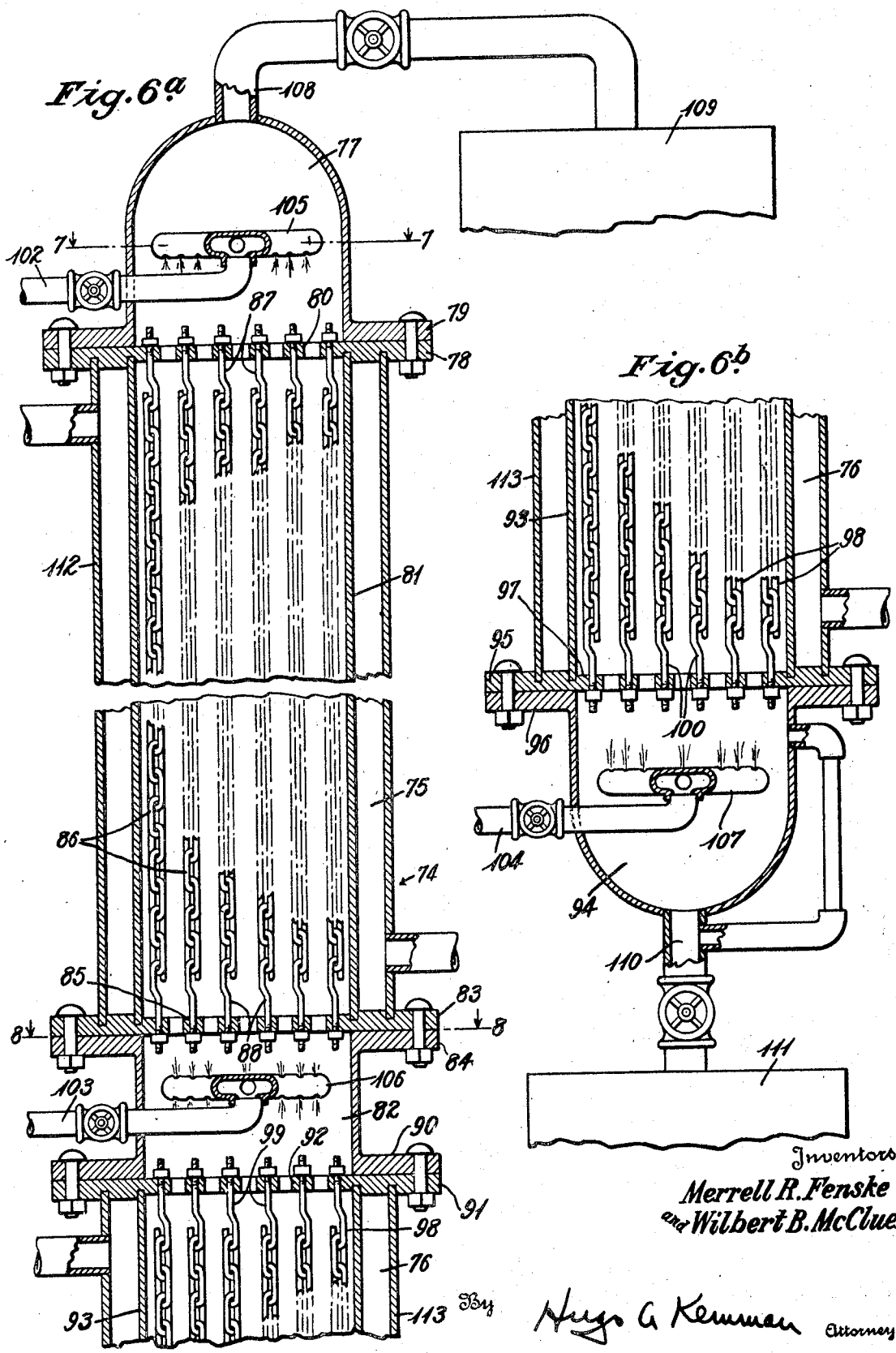

April 14, 1936.    M. R. FENSKE ET AL    2,037,319
PROCESS FOR TREATING MINERAL OILS
Filed Nov. 21, 1933    5 Sheets-Sheet 4
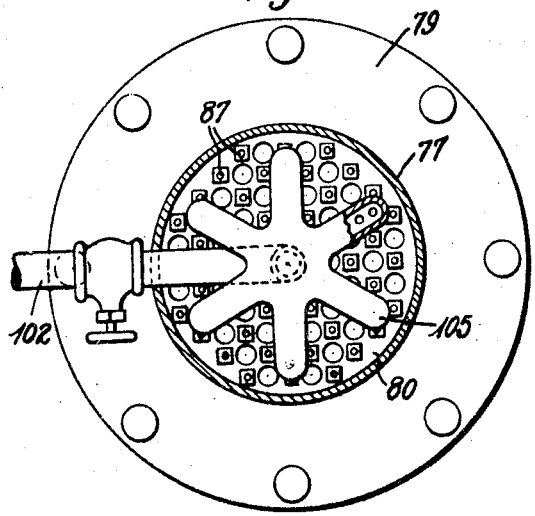
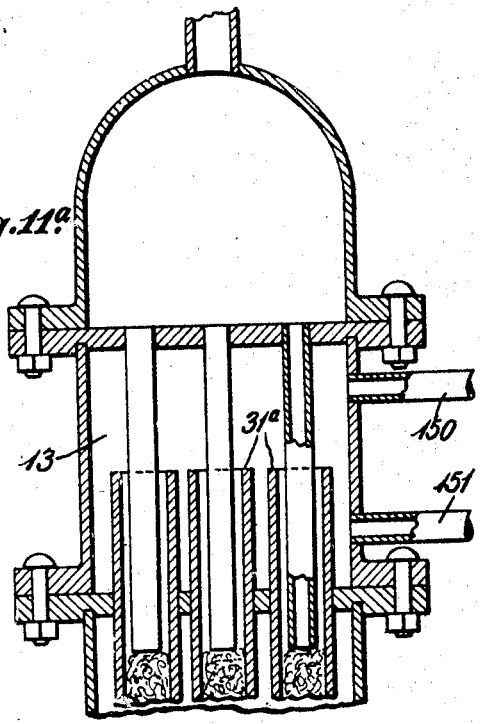
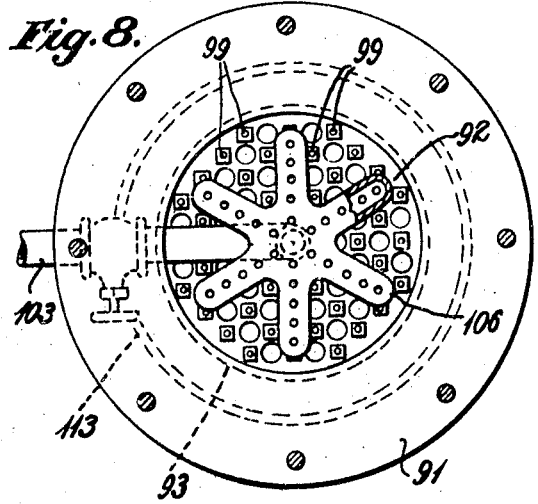
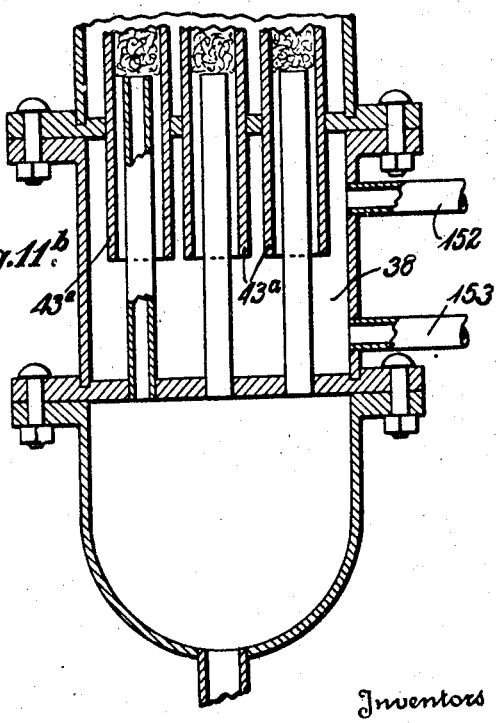
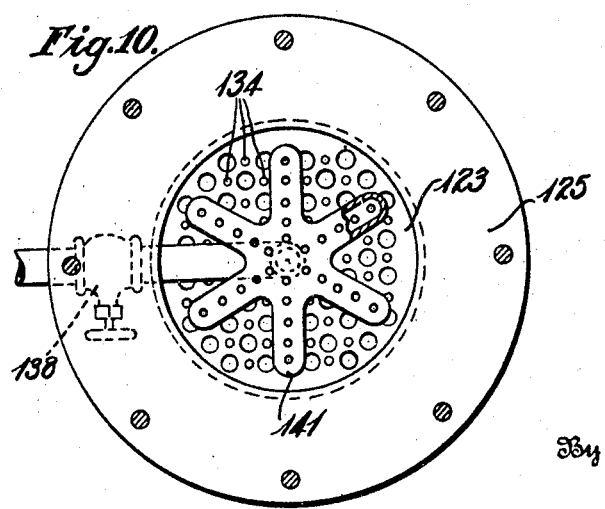
Inventors
Merrell R. Fenske
Wilbert B. McCluer
By Hugo A. Kenman Attorney

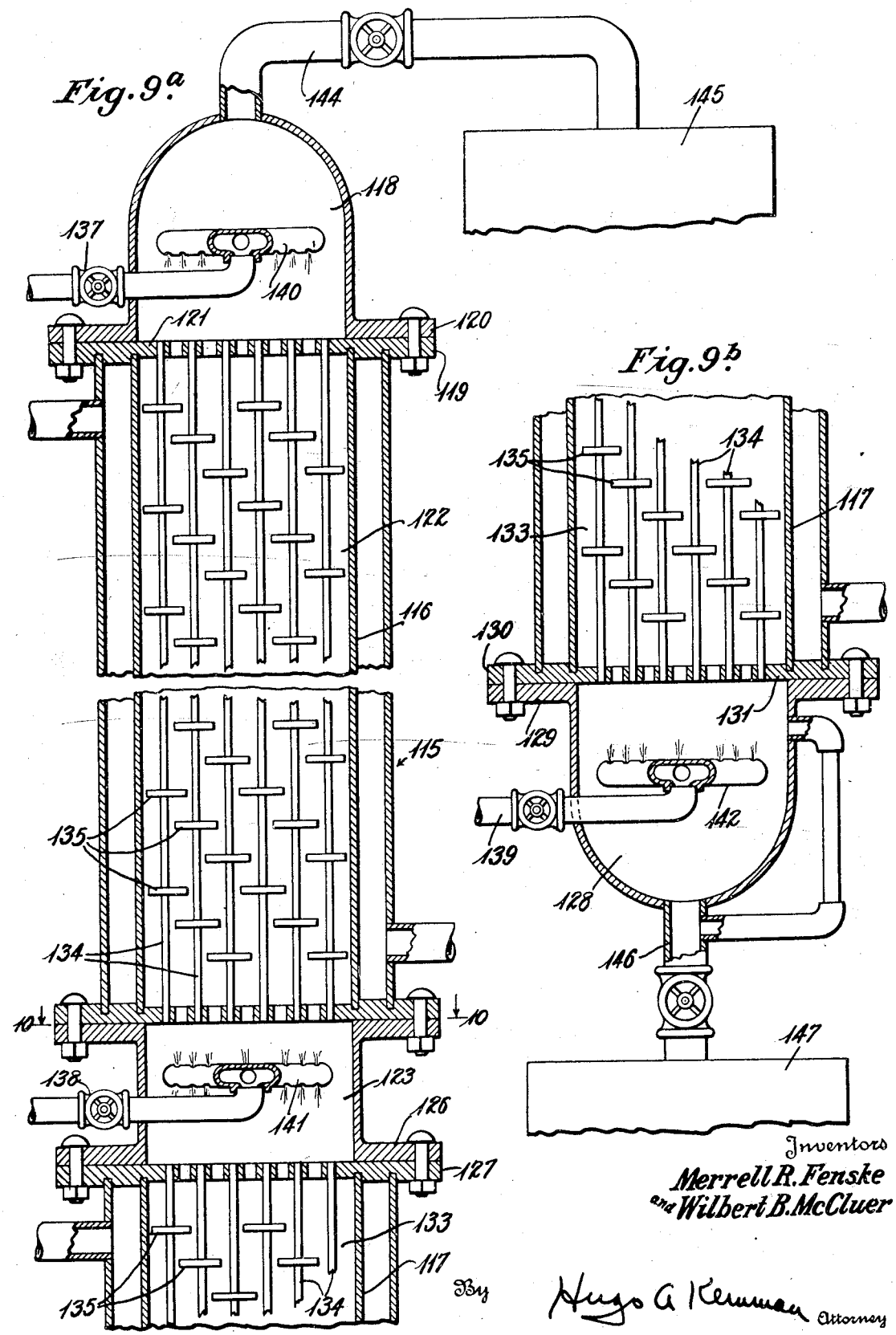

Patented Apr. 14, 1936

2,037,319

UNITED STATES PATENT OFFICE 2,037,319

PROCESS FOR TREATING MINERAL OILS

Merrell R. Fenske and Wilbert B. McCluer, State College, Pa., assignors to Pennsylvania Petroleum Research Corporation, a corporation of Pennsylvania Application November 21, 1933, Serial No. 699,050

13 Claims. (Cl. 196—13)

This invention pertains generally to the treatment of mineral oils and pertains particularly to the solvent extraction and/or fractionation thereof.

In copending application, Serial No. 688,416 by Merrell R. Fenske and Wilbert B. McCluer, is described a process and apparatus for the extraction and/or fractionation of mineral oils wherein a plurality of liquids of different densities are flowed countercurrently to each other by virtue of differences in their densities. The types of apparatus described in said copending application employ columns of the order of distillation or fractionation columns. In practicing said invention, the liquids enter the column at points which are spaced vertically along said column. At least one light solution of the liquids is taken off from the column at the top thereof, and at least one heavy solution of the liquids is taken off from the column at the bottom thereof.

The liquids employed in said process generally comprise a mineral oil and a solvent or solvents. If more than one solvent is employed the solvents may be mixed prior to their introduction into the column or one or more of the solvents may be mixed with the oil prior to its introduction into the column, or one or more of the solvents may be fed into the column at a separate point or points.

The invention herein comprises a specific form of the process and apparatus of the said copending application. It is specifically adapted for the treatment of a mineral oil with two or more solvents of different densities. It is particularly applicable when one solvent is lighter than the oil and another solvent is heavier than the oil, although this is by no means an essential feature as will hereinafter appear.

The liquids enter the column at vertically spaced points. For instance, a heavy solvent may enter the column at a high point, a light solvent may enter the column at a low point and an oil may enter the column at an intermediate point. By this means the oil and two solvents are caused to flow countercurrently to each other through the column and are brought into intimate contact therein to form two or more countercurrently flowing solutions of different densities which are taken off at the top and bottom of said column.

Other features of the invention reside in the construction, arrangement, and combination of parts, and in the steps, combinations and sequences of steps, all of which together with other features will become more apparent to persons skilled in the art as the specification proceeds and upon reference to the drawings in which like reference characters have been appended to like parts in the various figures, and in which:

Figure 1 is an elevation of a column of this invention.

Figure 2 is a sectional elevation of the column of Figure 1.

Figure 3 is a section on line 3—3 of Figure 2.
Figure 4 is a section on line 4—4 of Figure 2.
Figure 5 is a section on line 5—5 of Figure 2.

Figures 6a and 6b comprise a broken sectional elevation of another form of the invention.

Figure 7 is a section on line 7—7 of Figure 6a.
Figure 8 is a section on line 8—8 of Figure 6a.

Figure 9 is a sectional elevation of a further form of the invention.

Figure 10 is a section on line 10—10 of Figure 9.

Figures 11a and 11b comprise a broken section of the further form of the invention.

Referring now more particularly to Figures 1 to 5 inclusive, at 10 is shown a column comprising an upper portion 11 and a lower portion 12. Section 11 at its upper end is connected to a solution segregating chamber 13 as by flanges illustrated at 14. Segregating chamber 13 is connected at its upper end to a feeding chamber 15. The connection is illustrated as being made by flanges 16.

One of the flanges 16 is illustrated as being integral with a plate 17 which extends across the lower end of feeding chamber 15. Plate 17 is provided with a plurality of apertures 18 in which are secured the upper ends of feeding tubes 19.

Section 11 at its lower end is connected to the upper end of feeding chamber 21. The connection is illustrated as being made by flanges 22 and 23. Flange 22 is illustrated as being integral with a plate 24 which extends across the lower end of shell 25 of section 11.

The lower flange at 14 is illustrated as being integral with a plate 26 which extends over the upper end of shell 25 of section 11.

Plates 24 and 26 have a plurality of apertures 28 and 29 respectively which are aligned with each other and receive the opposite ends of a plurality of tubes 30 of substantially equal diameter and length. Tubes 30 may, if desired, be joined to plates 24 and 26 much the same as the tubes of a boiler are joined to the headers thereof.

Each tube 30 is preferably packed with a suitable packing material 31 which is supported in the tube by any suitable means, for instance by the means illustrated at 32.

Packing 31 may be of any suitable character.

Any of the various packings employed in distillation and fractionation processes may be employed. However, a packing which is particularly efficient is one which affords a relatively high surface area with a relatively high percentage of free space. The efficiency of the solvents is greatly increased thereby. Such packing is more particularly described in said copending application and in copending application Serial No. 677,755 filed June 26, 1933. This type of packing has many forms of which carding teeth, single turn, double turn, triple turn or polyturn helixes, open rings, bent carding teeth, H-shaped, S-shaped, and #-shaped wire forms are representative. The size of the wire may be comparable to that of ordinary carding teeth used in the textile industry and the dimensions of the various forms may also be generally comparable thereto. Other sizes may be employed.

Each tube 19 is associated with a separate tube 30 and extends downwardly therein as illustrated.

Lower section 12 as illustrated is identical with upper section 11 and corresponds to the inversion of upper section 11.

Section 12 has a shell 34 which at its upper end is joined to the lower end of feeding chamber 21 as by flanges 35. The lower of the two flanges 35 is illustrated as being integral with a plate 36 which extends over the upper end of shell 34.

Shell 34 at its lower end is joined to the upper end of segregating chamber 38 as by flanges 39. The upper of the two flanges 39 is illustrated as being integral with plate 40 which extends over the lower end of shell 34. Plates 36 and 40 have a plurality of apertures 41 and 42 respectively, which are aligned so as to receive a plurality of tubes 43 of substantially equal diameter and length.

Tubes 43 are shown packed with a packing 44, which may be supported in each tube by any suitable means such as the device 45 illustrated at the lower end thereof. Packing 44 may correspond to packing 31.

Segregating chamber 38 at its lower end is connected to feeding chamber 46 as by flanges 47. One of the flanges 47 is illustrated as being integral with a plate 48 which extends over the upper end of feeding chamber 46. Plate 48 is a duplicate of plate 17 and is provided with a plurality of apertures 49 in which are fitted feeding tubes 50.

Each tube 50 is associated with a separate tube 43 and extends upwardly therein for feeding purposes.

Chamber 15 is illustrated as having an inlet 52 controlled by a valve 53; chamber 13 is illustrated as having an outlet 54 controlled by a valve 55; chamber 21 is illustrated as having an inlet 56 controlled by a valve 57; chamber 38 is illustrated as having an outlet 58 controlled by a valve 59; and chamber 46 is illustrated as having an inlet 60 controlled by a valve 61.

Inlet 56 is shown connected to a liquid distributor 63 which may be of any suitable type. Distributor 63 as shown comprises extensions 64 on tubes 43 having ends 65 which are surrounded by extensions 66 on tubes 30. Extensions 66 have expanded ends 67 which are spaced about ends 65 of extensions 64 to form annular spaces 68 which are preferably of equal cross-sectional area and length.

The following will illustrate one manner of operating the invention. Heavy solvent is fed in at 52 into chamber 15 from which it is fed through tubes 19 into tubes 30. If tubes 19 are of substantially equal diameter and length, the heavy solvent will be substantially equally distributed between the tubes 30.

Light solvent is similarly fed in at 60 into chamber 46 from which it flows through tubes 50 up into tubes 43. The light solvent will be substantially equally distributed between tubes 43 if tubes 50 are of substantially equal diameter and length.

Oil is fed at 56 into chamber 21 and then through the distributor 63. If annular spaces 68 are of substantially equal cross-section and length the oil will be fed uniformly into each path formed by each aligned pair of tubes 30 and 43. It will be understood that other metering means may be provided in place of tubes 19, or 50, or in place of distributor 63.

The down flowing heavy solvent and the up flowing light solvent contact the oil and each other. The oil tends to rise in the heavy solvent and to fall in the light solvent. The light solvent rises in the heavy solvent. If all three liquids are partially miscible in each other, the result will be the formation of at least two tertiary solutions of different densities. The light solution flows upwardly in view of the greater density of the heavy solvent and heavy solution. The heavy solution flows downwardly. The up flowing liquids come in contact with the down flowing fresh heavy solvent, and the down flowing liquids come in contact with the up flowing light solvent, the result of which is that by the time the lighter materials reach chamber 13 substantially nothing is present but light solution and by the time the heavier materials reach chamber 38 substantially nothing is present but heavy solution. The light solution segregates itself in chamber 13 and the heavy solution segregates itself in chamber 38.

A countercurrent extraction and/or fractionation system is thus provided in which two or more solvents flow countercurrently to each other, in which the mineral oil to be extracted and/or fractionated is introduced into said countercurrently flowing solvents at a point in the common path thereof, and in which said liquids contact each other substantially uniformly over a relatively large surface area.

The countercurrently flowing liquids are brought into intimate contact as they flow through the tubes 30 and 43 by virtue of the packing in these tubes. The packing 31 and 44 causes the liquids to spread out into films of relatively large surface area compared to their volumes. The effect is greater when the more efficient packing materials are employed such for instance as those specifically described herein.

The tubes 30 and 43 may have a cross section of any desired geometrical configuration and within certain limits of any desired area. The cross section of each tube is preferably limited to an area sufficiently small to prevent serious channeling after any contacting means, for instance packing, has been arranged therein. The preferred limiting cross sectional area for each tube will be not only a function of the type of contacting means employed, since the small wire forms described herein will as a rule permit the use of a larger cross section without an inordinate falling off of efficiency than raschig rings or jack chain, but also of the manner in which the contacting means is arranged in each tube, for instance, of the degree of uniformity of distribution of packing. Since the tubes may have sides which are straight or indented or of other surface configuration, the departure of a tube from a straight or continuous form will have its influence. For this reason a definite limit in cross sectional area which, if exceeded in size, will no longer demonstrate the substantial increase in efficiency which we have discovered results from a constriction of cross sectional area cannot be given but may be readily determined, for instance, by testing the efficiency of single tubes of different sizes after any contacting means to be employed is arranged therein.

It may be stated as a general rule that one should proceed with caution after exceeding a cross sectional area equivalent to that of a circular tube in the neighborhood of three inches in diameter although, with the proper selection of packing or other contacting means and a careful distribution in each tube, it is possible that larger cross sectional areas may be employed while in other cases smaller cross sectional areas may be required. Therefore, the term "relatively small cross sectional area" or its equivalent when employed in this specification and in the claims is intended to mean a cross section which, when taken in conjunction with any contacting means, is sufficiently small to materially increase the contacting efficiency because of the constriction of its area.

Each solution will contain oil and solvents in different proportions. The solvent may be removed from each oil portion by any suitable means, for instance, by distillation if the solution is a liquid at room temperatures and atmospheric pressure, or by reducing the pressure if the solvent employed is a vapor at atmospheric pressure and normal temperatures, or by both.

If the process is carried out for the purpose of extraction, one of the oil portions will comprise raffinate and the other extract. If the process is carried out for the purpose of fractionation, one of the oil portions will have a greater viscosity than the other or in other words each portion will comprise a different fraction.

The column may be operated at any desired pressure. This pressure may be atmospheric, particularly if the solvents are liquid at atmospheric pressure, or elevated, particularly if this is necessary to maintain one or more of the solvents in the liquid phase (partially or wholly, as desired) while in the column, or reduced, should this be desirable for any reason, for instance, to bring a part of the solvent or solvents into the vapor phase.

The feeding rate of each solvent and of the oil should be such as to permit the countercurrent flow above referred to. The desired heavy solvent to light solvent ratio and the desired heavy solvent and/or light solvent to oil ratios will, of course, determine the relative rates of feeding of the solvents and of the oil.

In order to facilitate segregation at the bottom of the column and to assist the countercurrent flow, the segregated heavier solution is preferably maintained at a suitable level in chamber 38 above the outlet 58.

Shell 25 is shown provided with a plurality of openings 70 and shell 34 is shown provided with a plurality of openings 71. Openings 70 and 71 are provided for the purpose of circulating a heating or cooling fluid such as water, steam or brine about tubes 30 and 43 respectively for temperature control purposes.

Tubes 30 and 43 may be of any desired number, that is, one or more. The number employed will be governed by the desired through put of the column.

An effort should preferably be made to pack each set of tubes 30 and 43 uniformly or similarly so that the pressure drop through each tube of each set will be substantially the same. Substantially the same conditions will then exist in each tube of each set. Uniformity of results in each tube of each set is thus assured.

Since the result of having the tubes of substantially the same size and of substantially equally dividing each feed liquid among the tubes is to maintain substantially the same proportion of each phase to the others in each tube, it will be obvious that the tubes may be of different sizes and that the feeding rates may vary accordingly particularly if substantially the same proportion of phases is maintained in each tube.

In other words, the result of having the tubes of the same size and of maintaining uniform feeding conditions in each tube is to cause the raffinate phase produced by each tube to be of substantially the same composition as the raffinate phase produced by any other tube and to cause the extract phase produced by any tube to be of substantially the same composition as the extract phase produced by any other tube. From this it will be obvious that if the tubes should vary in size the feeding rates may be adjusted to obtain similar conditions.

The column may have any desired height. The height selected will be somewhat governed by the efficiency of the contact mechanism employed, and the desired time of contact between each unit volume of one liquid with any of the other liquids.

The column shown in Figures 1 to 5 inclusive is highly efficient and useful for the purposes for which it is intended. The liquids flow therethrough in a plurality of streams of substantially equal size without serious channeling particularly if the tubes are of relatively small diameter and substantially uniformly packed. It is to be understood that in its broader phases the invention includes other forms.

A different column, for instance, is illustrated at 74 in Figures 6a to 8 inclusive. Column 74 comprises an upper portion 75 and a lower portion 76. Upper portion 75 is joined at its upper end to the lower end of feeding and segregating chamber 77 as by flanges 78 and 79.

Flange 78 is illustrated as being integral with a perforated plate 80 which extends across the upper end of shell 81 of portion 75.

Portion 75 is illustrated as being connected at its lower end to the upper end of feeding chamber 82 as by flanges 83 and 84. Flange 83 is illustrated as being integral with a perforated plate 85 which extends over lower end of shell 81 of portion 75.

A plurality of attenuated members 86 are shown arranged between plates 80 and 85, being secured thereto by eye bolts 87 and 88 respectively. Members 86 may be of any desired character and preferably have relatively large surface areas. Jack chain or a similar material may be employed for this purpose.

Feeding chamber 82 is connected at its lower end to the upper end of portion 76 as by flanges 90 and 91. Flange 91 is illustrated as being integral with a plate 92 which extends across the upper end of shell 93 of portion 76.

The lower end of portion 76 is joined to the upper end of feeding and segregating chamber 94 as by flanges 95 and 96. Flange 95 is illustrated as being integral with a perforated plate 97 which extends across the lower end of shell 93 of portion 76.

A plurality of attenuated members 98 extend between plates 92 and 97 and are secured thereto as by eye bolts 99 and 100 respectively.

An inlet is illustrated at 102. Another inlet is illustrated at 103, and a third inlet is illustrated at 104. The inlets 102, 103, and 104 are illustrated as being connected to liquid distributors 105, 106, and 107 respectively.

Chamber 77 is illustrated as having an outlet 108 at its top which leads to a receiver 109. Chamber 94 is illustrated as having outlet 110 at its bottom which leads to a receiver 111.

From the foregoing it will be obvious that attenuated members 86 and 98 might be joined across chamber 82 or its equivalent with or without the use of plates 85 and 92 thus substituting each aligned pair of attenuated members 86 and 98 with a single attenuated member.

One manner of operation is as follows. Heavy solvent is fed at 102, oil is fed at 103 and light solvent is fed at 104. Each flows through the column 74 in the manner previously described in connection with the form shown in Figures 1 to 5. The result is the formation of two tertiary solutions. One solution flows upwardly into chamber 77 where it becomes segregated from the heavy downwardly flowing solvent entering at 102, and flows out through outlet 108 into the receiver 109. The other solution flows downwardly into chamber 94 where it becomes segregated from the light upwardly flowing solvent entering at 104, and flows out through outlet 110 into the receiver 111.

The segregated heavy solution is preferably maintained at a suitable level in chamber 94 to facilitate its segregation and to improve the operation of the column.

The attenuated members 86 and 98 cause the liquids to spread out into thin films, and to flow through the devious paths thus causing them to intimately contact each other. Members 86 and 98 may be of any desired number and are preferably closely spaced. The number shown in the drawings is not intended to be representative.

This form of the invention may also be provided with heat exchange means, for instance, by providing the shells 81 and 93 with jackets for the flow of either a heating or a cooling fluid. Such jackets are illustrated at 112 and 113.

A further form of apparatus is illustrated in Figures 9 and 10. In this form column 115 comprises upper portion 116 and lower portion 117. Portion 116 at its upper end connects to a feeding and segregating chamber 118 as by flanges 119 and 120.

Flange 119 is illustrated as being integral with a perforated plate 121 which extends across the upper end of shell 122 of portion 116.

Portion 116 is illustrated as being connected at its lower end to the upper end of feeding chamber 123 as by flanges 124 and 125. Feeding chamber 123 is illustrated as being connected at its lower end to the upper end of portion 117 as by flanges 126 and 127.

The lower end of portion 117 is illustrated as being connected to the upper end of feeding and segregating chamber 128 as by flanges 129 and 130.

Flange 130 is illustrated as being integral with a perforated plate 131. Perforated plates 121 and 131 support therebetween a plurality of attenuated members 133 which are illustrated as being discontinuous at chamber 123 although they may be continuous as will be obvious. Each attenuated member 133 comprises a rod 134 having a plurality of spaced discs 135. Discs 135 on adjacent rods are preferably vertically spaced from each other and preferably overlap laterally as illustrated. Any suitable order for the discs 135 may be chosen, for instance, that illustrated, having in mind the purpose thereof.

Inlets 137, 138, and 139 are illustrated as being connected to distributors 140, 141, and 142 respectively.

Chamber 118 is illustrated as having outlet 144 at its top which leads to a receiver 145.

Chamber 128 is shown with an outlet 146 at its bottom which leads to a receiver 147.

Any type of temperature control means such as jackets for steam, water or brine may be provided for controlling the temperature of the liquids while in the column.

The feeding of liquids into column 115 may be similar to that described in connection with the previous forms in which case the heavy solvent, oil, light solvent, heavy solution and light solution will be brought into intimate contact as they pass through the devious paths provided in the column by the attenuated members 133. Members 133 may be of any desired number.

Many other variations in constructional form may be resorted to.

The solvents may comprise a single or a plurality of compounds. When a plurality of compounds are employed, they may be miscible or partially miscible. A plurality of non-miscible solvents might also be employed.

In the apparatus previously described when the result is the formation of two non-miscible solutions of different density, one of the solutions will be segregated and taken off at the top of the column and the other will be segregated and taken off at the bottom of the column. Should the result be the formation of more than two non-miscible solutions such as three, the third solution will rise with the lightest solution or will settle with the heaviest solution, depending among other things on the relative densities of the solutions and the rates and points of feed of the various liquids into the column.

The third solution may be removed from the column along with the lightest solution or along with the heaviest solution as the case may be, and the two solutions may be separated by any suitable means such as by decantation.

However, the segregating chambers at the top and bottom of the column may be so constructed as to continuously segregate the two solutions. This is illustrated in Figures 11a and 11b in which Figures 2a and 2b have been substantially reproduced except that tubes 31a extend up into chamber 13 to a point substantially midway thereof; tubes 43a extend downwardly into chamber 38 to a point substantially midway thereof; outlet 54 of chamber 13 has been substituted by outlets 150 and 151 at the top and bottom of chamber 13; and outlet 58 of chamber 38 has been substituted by outlets 152 and 153 at the top and bottom of chamber 38.

The operation of the invention illustrated in Figures 11a and 11b is as follows: Let it be assumed that two of the three or more non-miscible solutions rise in the column. These two solutions will be delivered to chamber 13 through tubes 31a. The two solutions separate due to differences in density and the lighter solution is taken off at 150 and the heavier solution at 151. The purpose of extending tubes 31a is to deliver the two solutions to the chamber 13 at a point at which the concentrations of the solutions in chamber 13 are substantially the same as their concentrations when they leave the tubes 31a.

Should the two solutions settle in the column, the lighter of the two would be withdrawn at 152 and the heavier at 153.

The modified construction of Figures 11a and 11b would take care of a 4 layer system if the column were operated so that two of the non-miscible solutions would rise and the other two would settle. However, the construction might be modified to take care of three or more non-miscible layers in one segregating chamber if such conditions were obtained.

It is to be particularly noted that the construction of Figures 11a and 11b would separate any non-miscible liquids which might reach the segregating chambers regardless of whether two or more solutions were formed.

While the invention has been particularly described in connection with the treatment of mineral oils, it may also be applied to the treatment of materials in general, whether or not the more valuable, the less valuable, or an equally valuable material is separated from the base material. While in the foregoing description the solvents have been referred to as being fed into the column at the ends thereof and the oil as being fed into the column at an intermediate point, this is by no means an essential feature. Any one or more of the liquids might be fed into the column at an intermediate point or points if desired for any reason, or certain of these liquids might be fed in at the ends while one or more of the liquids are fed into the column at an intermediate point or points. In general, the liquids will be fed into the column at vertically spaced points in the order of their densities, the density increasing from the bottom to the top. This rule may be departed from but in any case, the densities of the respective liquids and the densities of the solutions formed will be taken into consideration.

For instance, the oil might be fed in at the top of the column, one solvent at an intermediate point, and a second solvent at the bottom, particularly in cases in which the oil is heavier than the solvents. Or, in the latter case, the oil might be fed in at an intermediate point, the lighter solvent at the bottom, and the heavier solvent at the top, particularly if the heavier solvent is heavier than the light solution.

The oil might be fed in at the bottom, one solvent at an intermediate point, and another solvent at the top, particularly when the oil is lighter than both solvents. In the latter case the lighter of the solvents could be fed in at the bottom, the oil at an intermediate point, and the heavier solvent at the top, particularly if the lighter solvent is lighter than the heavier solution.

In cases in which the oil is fed either at the top or at the bottom and both solvents flow countercurrently to the oil, the oil meets two different solvent conditions in the column. For instance, in cases in which the oil is introduced at the top of the column and flows downwardly and the two solvents flow upwardly, the oil is first treated by a mixture of the two solvents and then after it passes the intermediate point of solvent feed, it is treated by one solvent alone.

The same is true when the oil is fed at the bottom of the column and both solvents flow countercurrently thereto.

The solvent introduced at the intermediate point may or may not cause precipitation of the material and/or may or may not be selective as to the same type and/or size of molecule as the solvent introduced at the end (either top or bottom as the case may be).

If the solvent introduced at the end were selective as to type of molecule and the solvent introduced at the intermediate point were selective as to size of molecule, we should expect that the undissolved oil withdrawn from the system would not only have a larger part of the less valuable compounds removed but would also have a larger part of the lower boiling compounds removed.

In cases in which a counter flow of solvents is obtained with the oil entering at an intermediate point, if one solvent were selective as to one type of molecule and the other as to another type of molecule, one of the solutions which is taken off at one end would have a preponderance of one type of molecule and the other solution taken off at the opposite end of the column would have a preponderance of another type of molecule.

Other methods of feeding the column will suggest themselves to persons skilled in the art upon becoming familiar herewith.

The following specific examples will serve to further illustrate the foregoing.

For instance, pyridine which has a density of .99 can be fed at the top, methylcellosolve which has a density of .96, or methanol which has a density of .8, or both can be fed at the bottom and oil of any density, say, for instance, .92, can be fed at an intermediate point. Or the feeding points of oil and methylcellosolve may be reversed. Or oil can be fed at the top, a monohydric aliphatic alcohol at an intermediate point, and acetone at the bottom. Other combinations will suggest themselves to persons skilled in the art upon becoming familiar herewith.

Any of the columns may be operated at elevated pressures, atmospheric pressure, or reduced pressures as previously referred to.

The term solvent in its broader phases includes any compound or compounds, whether in the vapor, liquid and/or solid phase and regardless of its influence upon the base material.

Although the liquids have been referred to as being partially miscible, it is to be kept in mind that miscibility is a function of temperature and relative concentrations. It would, therefore, be possible to raise the temperature of the liquids in the column so as to cause complete solution of two or more or all of the liquids therein, in which case separation might be effected upon cooling of the solution or solutions thus obtained.

The relative densities of solvents and of mineral oils may be obtained upon reference to any standard handbook or by actual measurement.

Particular forms of apparatus have been described for the purpose of illustration. It is to be strictly understood that wide departures may be made from the forms shown in the drawings such as by changes, omissions, additions, substitutions, and/or modifications without departing from the spirit of the invention. The claims, therefore, are intended to be limited only as required by the prior art.

The term "phase contacting path" or equivalent terms as used in the claims denotes a path adapted to intimately contact or mix liquid phases passing therethrough as distinguished from channeling caused by phase separation.

The terms "substantially equal", "substantially the same" and similar terms as used herein have a sufficiently broad significance to include "equal", "the same", etc.

The term "vertically arranged" as used in the specification and in the claims to describe the positioning of the attenuated packing members includes not only an arrangement wherein the attenuated packing members are positioned perpendicularly to the plane of the horizon but also an arrangement wherein the attenuated packing members are sufficiently upright to carry out the purposes of this invention.

Reference is made to copending applications Serial No. 10,932 filed March 13, 1935, Serial No. 704,052 filed December 26, 1933, and Serial No. 708,515 filed January 26, 1934.

We claim:

1. A process for contacting at least three liquid phases of incomplete and partial miscibility to form at least two resultant phases such as in the solvent treatment of mineral oils, comprising introducing said initial phases into a plurality of phase contacting paths connected in parallel, arranging the points of introduction of said initial phases into said phase contacting paths such that at least two of said initial phases will flow countercurrently to each other in said phase contacting paths by virtue of a difference in their densities, and confining each phase contacting path to a relatively small cross sectional area so as to prevent substantial channeling of said phases through each other.

2. A process for contacting at least three liquid phases of incomplete and partial miscibility to form at least two resultant phases such as in the solvent treatment of mineral oils, comprising introducing said initial phases in substantially the same proportions one to the other into a plurality of phase contacting paths connected in parallel, arranging the points of introduction of said initial phases into said phase contacting paths such that at least two of said initial phases will flow countercurrently to each other in said phase contacting paths by virtue of a difference in their densities, and confining each phase contacting path to a relatively small cross sectional area so as to prevent substantial channeling of said phases through each other.

3. A process for contacting at least three liquid phases of incomplete and partial miscibility to form at least two resultant phases such as in the solvent treatment of mineral oils, comprising introducing said initial phases in substantially the same proportions one to the other into a plurality of phase contacting paths, arranging the points of introduction of said initial phases into said phase contacting paths such that at least two of said initial phases will flow countercurrently to each other in said phase contacting paths by virtue of a difference in their densities, confining each phase contacting path to a relatively small cross sectional area so as to prevent substantial channeling of said phases through each other, removing and uniting the streams of the lighter of said resultant phases at the tops of said phase contacting paths, and removing and uniting the streams of the heavier of said resultant phases at the bottoms of said phase contacting paths.

4. In a proces for contacting a mineral oil and at least two solvents wherein at least two of said liquids are caused to flow countercurrently to each other by virtue of a difference in density, the steps of dividing each of said liquids into a plurality of relatively small streams, contacting said streams so that each stream of each liquid contacts one stream of each of the other liquids in an elongated phase contacting path which is segregated from all of the other streams, at least three of said liquids having each a separate point of entry into said paths, and substantially uniformly distributing the counterflowing streams across the cross section of each phase contacting path by confining each phase contacting path to a sufficiently small cross sectional area.

5. In a process for contacting a mineral oil and at least two solvents wherein at least two of said liquids are caused to flow countercurrently to each other by virtue of a difference in density, the steps of dividing each of said liquids into a plurality of relatively small streams, contacting said streams so that each stream of each liquid contacts one stream of each of the other liquids in an elongated phase contacting path which is segregated from all of the other streams, substantially uniformly distributing the counterflowing streams across the cross section of each phase contacting path by confining each phase contacting path to a sufficiently small cross sectional area to prevent serious channeling, and introducing said liquids into each phase contacting path in substantially the said proportions one to the other.

6. In a process for contacting a mineral oil and at least two solvents wherein at least two of said liquids are caused to flow countercurrently to each other by virtue of a difference in density, the steps of dividing each of said liquids into a plurality of relatively small streams, contacting said streams so that each stream of each liquid contacts one stream of each of the other liquids in an elongated phase contacting path which is segregated from all of the other streams, substantially uniformly distributing a packing medium in each phase contacting path, and confining each phase contacting path to a sufficiently small cross sectional area to prevent serious channeling.

7. In a process for contacting a mineral oil and at least two solvents wherein at least two of said liquids are caused to flow countercurrently to each other by virtue of a difference in density, the steps of dividing each liquid into a plurality of relatively small streams, contacting said streams so that each stream of each liquid contacts one stream of each of the other liquids in an elongated phase contacting path which is segregated from all of the other streams, substantially uniformly distributing the counterflowing streams across the cross section of each phase contacting path by confining each path to a sufficiently small cross sectional area to prevent serious channeling, and combining the streams of each resultant phase after leaving said phase contacting paths.

8. A process for contacting an oil and a plurality of solvents, comprising introducing said liquids at three vertically spaced points into a column having a plurality of attenuated packing members vertically arranged therein, said packing members being spaced from each other, and choosing the points of introduction of said liquids into said column such that at least two of said liquids will flow through said column countercurrently to each other.

9. In a process involving the contacting of a mineral oil and at least two solvents in a common path wherein at least two of said liquids are caused to flow countercurrently to each other by virtue of a difference in their densities, the steps of causing at least one of said liquids to flow through said common path in a widely distributed form by conducting said liquid through said common path over a plurality of vertically arranged packing mediums each of which has a relatively long and narrow shape, said packing mediums being wetted by said liquid.

10. In a process involving the contacting of a mineral oil and at least two solvents in a common path wherein at least two of said liquids are caused to flow countercurrently to each other by virtue of a difference in their densities, the steps of causing at least one of said liquids to flow through said common path in widely distributed form by conducting said liquid through said common path over a plurality of vertically arranged packing mediums each of which has a relatively long and narrow shape, said packing mediums being wetted by said liquid, and separately encasing each of said packing mediums to confine said counterflow to said packing mediums.

11. A process for treating a mineral oil with a plurality of solvents, comprising introducing said liquids into a contacting column at vertically spaced points, said column comprising a group of phase contacting paths of relatively small cross sectional area and connected in parallel, the points of entry of said solvents into said parallelly connected phase contacting paths being spaced from each other and from the point of entry of said oil, said points of entry of said solvents being on the same side of the point of entry of said oil, and choosing said solvents as to density so that said solvents will flow through said column in the same direction and countercurrently to said oil.

12. A process for treating a mineral oil with two solvents, comprising introducing said liquids into a contacting column at vertically spaced points, said column comprising a group of phase contacting paths connected in parallel, the points of entry of said solvents into said parallelly connected phase contacting paths being spaced from each other and from the point of entry of said oil, said points of entry of said solvents being on opposite sides of the point of entry of said oil, choosing said solvents as to density so that said solvents will flow through said column in opposite directions, and confining each phase contacting path to a sufficiently small cross sectional area to prevent substantial channeling.

13. A process for contacting at least three liquid phases of incomplete and partial miscibility to form at least two resultant phases such as in the solvent treatment of mineral oils, comprising introducing said liquids at three vertically spaced points into a column having a plurality of attenuated packing members vertically arranged side by side therein, said packing members having spaces therebetween, and choosing the points of introduction of said liquids into said column such that at least two of said liquids will flow through said column countercurrently to each other.

MERRELL R. FENSKE.
WILBERT B. McCLUER.